Oct. 1, 1963 R. D. BLACK 3,105,309
EDUCATIONAL DEVICES
Filed Sept. 25, 1958 2 Sheets-Sheet 1
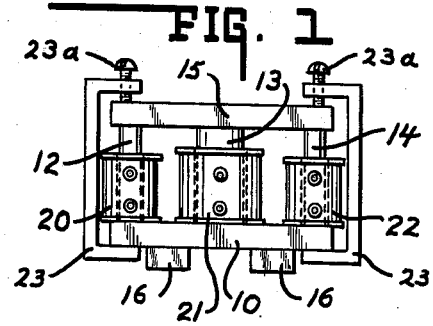
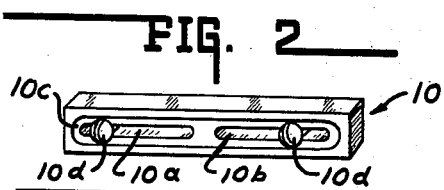
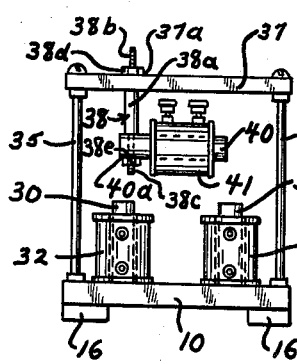
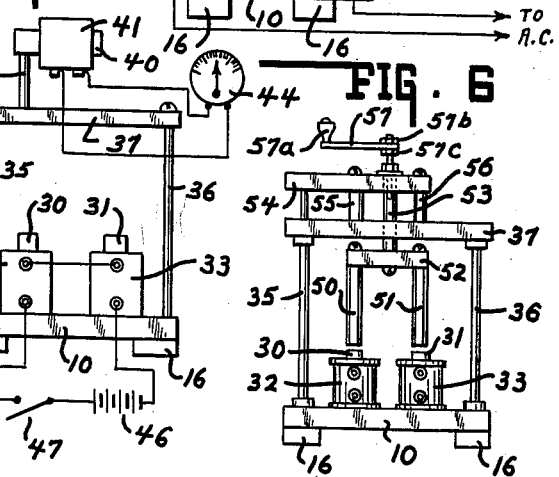
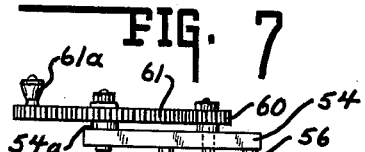
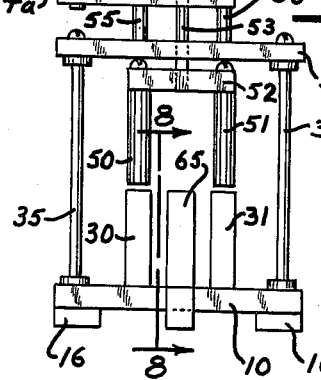
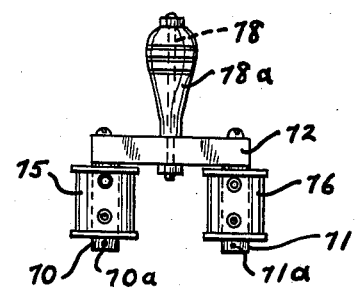
INVENTOR.
ROY D. BLACK.
BY
Lockwood, Galt, Woodard + Smith
ATTORNEYS.

Oct. 1, 1963
R. D. BLACK
3,105,309
EDUCATIONAL DEVICES
Filed Sept. 25, 1958
2 Sheets-Sheet 2
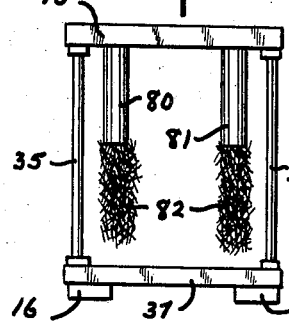
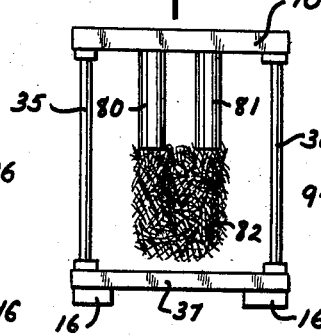
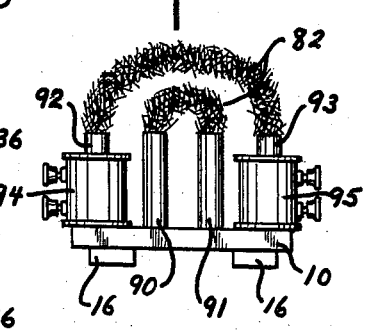
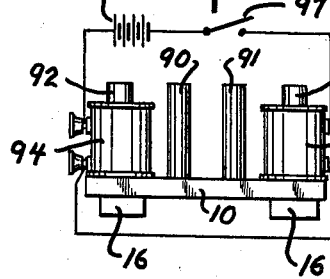
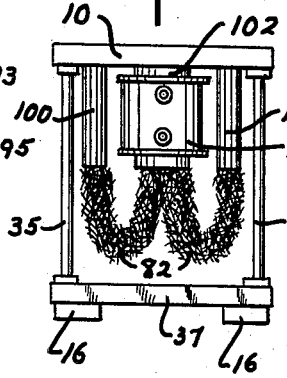
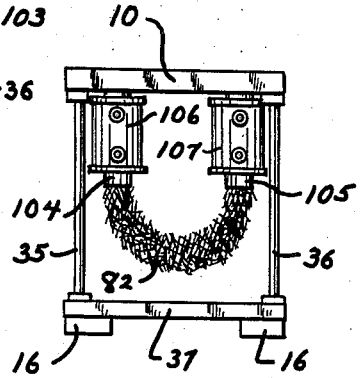
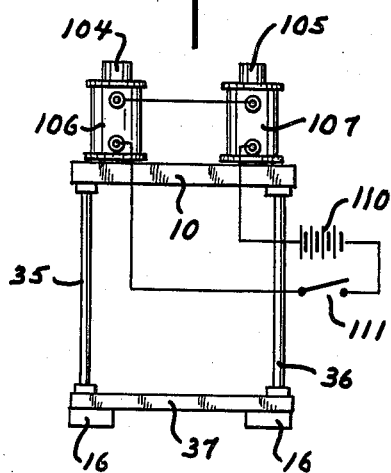
INVENTOR.
Roy D. Black.
BY
Lockwood, Galt, Woodard & Smith
ATTORNEYS.

United States Patent Office 3,105,309
Patented Oct. 1, 1963

3,105,309
EDUCATIONAL DEVICES
Roy D. Black, Wabash, Ind., assignor to
Leonard R. Crow, Vincennes, Ind.
Filed Sept. 25, 1958, Ser. No. 763,280
6 Claims. (Cl. 35—19)

The present invention relates to educational devices and more particularly to a teaching aid for the field of electricity and magnetism which provides effective instruction and demonstration either by way of correspondence or in the regular classroom.

As is well known, it is sometimes difficult for a student to effectively understand certain electrical and magnetic principles without the aid of a visual demonstration thereof. Prior instruction in this respect has been limited principally, for example, to the use of graphs or photographs showing certain electrical or magnetic phenomena or to the mechanism used for effecting such phenomena, and the actual demonstration of the desired principles with simple and convenient educational apparatus represented, in large measure, a void in these prior teaching methods.

By virtue of the applicant's novel invention, a new and improved teaching aid is provided which is made up of certain components adaptable to be arranged and assembled in various combinations to enable the illustration and demonstration of various laws, principles and applications of electrical, magnetic and electromagnetic phenomena. The novel invention disclosed herein provides a ready and effective means for the student to achieve a thorough understanding of any scientific principles under study and discussion.

The instant invention includes the use of a basic component or core forming the foundation of the teaching aid and on which may be built, with additional components, a multiplicity of structures for teaching various principles in the area of electricity and magnetism. The present educational device provides in its design a unit which offers ease and economy in manufacture. With its use, effective demonstration may be achieved of phenomena including, by way of example, the operation of an electromagnet, the flux path between magnetic bodies and the effect of inductance, all of which are to be discussed more fully herebelow.

The principal object of the present invention, therefore, is to provide a teaching aid which may be used for demonstrating various electrical and magnetic phenomena.

Another object of the present invention is to provide an educational device which utilizes a common base unit on which different components may be assembled, in various combinations, to effect apparatus for the visual demonstration of any desired scientific phenomena in the field of electricity and magnetism.

A further and more general object of the invention is to provide educational devices in the form of a teaching aid which may be readily and simply assembled and disassembled to permit the formation, with any desired components, of structures useful for teaching and demonstrating electrical and magnetic principles.

Other objects and a better understanding of the invention will become more apparent from the following description, taken in conjunction with the accompanying drawings, in which FIG. 1 is a view in front elevation of a typical demonstration unit assembled in accordance with the instant invention;

FIG. 2 is a view in perspective of a core structure used as a base unit for the various teaching aids which may be assembled in accordance herewith;

FIG. 3 is a diagram showing a typical electrical and magnetic circuit used in conjunction with a demonstration unit of the type shown in FIG. 1;

FIG. 4 is a view in front elevation of another demonstration unit assembled in accordance with the instant invention;

FIG. 5 is a diagram of a typical electrical and magnetic circuit used in connection with a demonstration unit modified but of the general type of that of FIG. 4;

FIG. 6 is a view in front elevation of another typical demonstration unit assembled in accordance with the instant invention;

FIG. 7 is a view in front elevation of still another typical demonstration unit assembled in accordance with the instant invention;

FIG. 8 is a view in vertical section, taken at line 8—8 of FIG. 7 and looking in the direction of the arrows, showing the components comprising a typical core arrangement;

FIG. 9 is a view in front elevation of still another typical demonstration unit assembled in accordance with the applicant's novel invention;

FIG. 10 is a view in front elevation of yet another typical demonstration unit assembled in accordance with the instant invention, with the unit designed for demonstrating principles of a permanent magnet;

FIG. 11 is a view in front elevation of a modified demonstration unit of FIG. 10;

FIG. 12 is a view in front elevation of yet another demonstration unit assembled in accordance with the instant invention, with the unit designed for demonstrating the combination of the principles of electromagnetism with permanent magnets;

FIG. 13 is a diagram of a typical electrical and magnetic circuit used in conjunction with the demonstration unit of FIG. 12;

FIG. 14 is a view in front elevation of yet another demonstration unit assembled in accordance with the instant invention;

FIG. 15 is a view in front elevation of still another typical assembly in accordance with the instant invention, with the unit designed for demonstrating certain electromagnetic effects; and, FIG. 16 is a view of a typical electrical and magnetic circuit for achieving the electromagnetic effects of a demonstration unit modified but of the general type of that of FIG. 15.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1, 2 and 3, a typical form of teaching aid is disclosed, assembled in accordance with the instant invention, comprising a base core 10 having vertically upstanding cores 12, 13 and 14 positioned thereon and an upper core 15 lying across the ends of the latter in a generally horizontal plane. The core 10 is formed from a magnetizable material such as iron, for example, and has vertical slots 10a and 10b extending therethrough, with a shallow longitudinal recess 10c being provided in the bottom of the core 10 beneath the slots 10a and 10b to receive one or more conventional screws 10d which extend upwardly in the vertical slots 10a and 10b during use to receive and fasten onto other components, to be discussed herebelow. It should be apparent that instead of vertical slots 10a and 10b in the core 10, a series of holes may be provided therethrough for a modified form of core, with the holes being adapted to receive the screws 10*d* for securing the desired components onto the core structure at any preselected spaced apart positions.

To promote stability of the demonstration unit, base elements or feet 16 are preferably provided, with the base elements 16 engaging the core 10 by means of conventional machine screws, for example, which are preferably made from a nonmagnetic material so as to have no effect on the magnetic circuit of the demonstration unit. The demonstration unit of FIG. 1 is further provided with coils 20, 21 and 22 which respectively encircle cores 12, 13 and 14 and conventional U-clamps 23 which serve to retain the unit in assembled relationship by means of threaded screws 23*a*.

As should be apparent, the teaching unit disclosed by FIG. 1 may be used to demonstrate a conventional E core type of transformer, but it is especially adaptable for the demonstration of a saturable core reactor when coils 20 and 22 are properly connected to an alternating current source and when coil 21 is connected in a direct current circuit through a knife-switch 25 and a direct current power source 26, as shown in the circuit of FIG. 3. With respect to the latter, it should be apparent that by increasing the distance between the coils 20 and 22 by moving their respective cores 12 and 14 along the core 10 in vertical slots 10*a* and 10*b* by unloosening the fastening screws 10*d* therefor, the demonstration unit provides an effective assembly for teaching the effect produced by increased core reluctance. Moreover, it should be further apparent that when the core 15 is removed, the demonstration unit becomes a most excellent form of electromagnet for teaching purposes.

The demonstration unit of FIG. 1 is susceptible to considerable changes to effect other types of teaching aids. For example, one or more permanent magnets may be substituted between core 10 and core 15 for the core 13 and its respective coil 21 with the permanent magnets used to produce unidirectional flux for controlling the saturation of cores 12 and 14. Thus, the unidirectional magnetic flux from the permanent magnets changes and controls the alternating current flow in accordance with the flux change resulting from varying the relative position of the permanent magnets along the longitudinal axes of the cores 10 and 15.

The degree of unidirectional magnet flux flow from the permanent magnets may also be altered by the amount of cross-sectional area thereof which is in contact with the core 10 and the core 15. For example, the permanent magnets may be placed between core 10 and core 15 with only a small portion of their ends in contact therewith, and the permanent magnets may then be pushed further into contact with the cores, i.e. with increasing overlapping cross-sectional areas thereof, until the desired amount of unidirectional permanent magnet flux saturates the cores 10 and 15 of the magnetic structure to permit the desired amount of alternating current to flow.

Referring now to FIGS. 4 and 5, where, as in all the figures herein, like reference numerals are used to designate similar parts, cores 30 and 31 are shown positioned on and secured to the core 10, in a manner similar to that discussed hereabove with reference to FIG. 1, with coils 32 and 33 surrounding the cores 30 and 31, respectively. Also disposed on core 10 are upstanding support members 35 and 36 which have a crossarm 37 connecting the free upper ends thereof. Members 35 and 36 as well as the crossarm 37 are formed from a nonmagnetic material, with the lower ends of the support members 35 and 36 engaging the core structure 10 by fastening members, such as conventional screws, for example, as discussed hereabove with reference to the cores 12, 13 and 14 of FIG. 1.

A stud 38 extends through an opening 37*a* in crossarm 37, the upper end of which extends through an opening 40*a* in a core 40. It should be understood that the stud 38 has a centrally enlarged portion 38*a* and smaller diameter threaded portions 38*b* and 38*c* at either end thereof, the latter respectively serving, in conjunction with nuts 38*d* and 38*e*, to support the stud 38 on the crossarm 37 as well as to position and support the core 40. A coil 41 surrounds and is supported on the core 40 and the unit is so arranged that the core and coil assembly, 40 and 41, respectively, may be adjusted vertically through movement of either nut 38*d* or 38*e*, depending upon whether the core and coil assembly is in the position of FIG. 4 or FIG. 5. Movement of the core 40 with reference to cores 30 and 31 serves to change the magnetic reluctance of the air gap therebetween.

The teaching aid of FIGS. 4 and 5 may be effectively used for demonstrating the phenomena of inductance. In FIG. 5, an electrical meter 44, calibrated in milliamperes, for example, is shown connected across the terminals of the coil 41. A direct current circuit is formed between coils 32 and 33, a direct current power source 46, such as a common battery, for example, a conventional knife-switch 47, with all of these components being connected in series.

In use, when knife-switch 47 is closed, a current momentarily flows through coils 32 and 33, producing an electromagnetic field which passes through the air and through core 40 preselectively positioned thereabove. A voltage is thereby induced in coil 41 which deflects the indicator on the electrical meter 44 in one direction. The indicator is, of course, momentarily deflected in the opposite direction when the knife-switch 47 is opened. It should be thus apparent that the amount of deflection of the indicator of the electrical meter 44 is controlled by adjusting the distance between the cores 30 and 31 and the core 40, as discussed hereabove, and as shown by FIG. 4 and FIG. 5.

It should be apparent that the support members 35 and 36 and the crossarm 37, as well as the stud 38 may be removed, and the core 40, with the coil 41 supported thereon, positioned so that the ends thereof directly rest on the upper ends of the cores 30 and 31. With this arrangement, a lamp may be connected across the terminals of the coil 41 in place of the meter 44. With the same direct current circuit as discussed above, each time the knife-switch 47 is opened or closed, the lamp lights thereby further demonstrating the phenomena of electrical induction.

Referring now to FIGS. 6, 7 and 8, another typical demonstration unit is disclosed which comprises a core 10 having base members or feet 16 therebelow and cores 30 and 31, with their respective coils 32 and 33, positioned on the upper surface thereof. Support members 35 and 36 extend upwardly from the core 10 and a crossarm 37 is provided therebetween, all as generally discussed hereabove. The demonstration unit of FIG. 6 differs from the preceding structures in that two permanent magnets 50 and 51, fastened together at the upper ends thereof by a core 52, extend downwardly above the cores 30 and 31. A stud 53 made from a nonmagnetic material extends through an opening 37*a* in the crossarm 37 and fastens into the core 52, the upper end of the stud 53 extending through and being positioned on a member 54 which lies generally parallel to crossarm 37 and is spaced apart therefrom by members 55 and 56. The structure is arranged so that the stud 53 acts as an axle which is free to turn in bearings formed by the crossarm 37 and the member 54. A crank 57 having a handle 57*a* is provided at the upper end of stud 53 by means of lock nuts 57*b* and 57*c*, for example, for rotating the stud 53 and hence the permanent magnets 50 and 51.

When the demonstration unit disclosed in FIG. 6 is used, the permanent magnets 50 and 51 thereof are rotated above the cores 30 and 31, causing magnetic lines of force to cut through the coils 32 and 33, effecting a voltage and thereby lighting a lamp, for example, which may be connected across the terminals of the coils 32 and 33. It should be apparent, therefore, that the teaching device of FIG. 6 provides an effective means for demonstrating the action of an electric generator.

Referring now to FIGS. 7 and 8, a demonstration unit is provided which is generally similar in purpose to that discussed above in connection with FIG. 6. However, in this unit a small diameter gear 60 is provided at the upper end of the rotatable stud 53, which gear 60 is engaged by a larger diameter gear 61 which rotates on the member 54 at point 54a. A handle 61a is provided on the gear 61 to permit the ready rotation thereof.

The structure of FIG. 7 is further modified from that disclosed in FIG. 6 by the use of cores 64 and 65 in addition to cores 30 and 31, which for purposes of clarity in the figures are shown without their respective coils. The cores 64 and 65 are secured to a generally notched core 66, as through conventional screw means, for example, which is positioned under the core 10, in engagement and at right angles therewith. In view of the use of the gears 60 and 61, a demonstration unit is achieved wherein one or more permanent magnets are rotatable above the upper ends of one or more cores at a rate of rotation faster than was possible with the crank arrangement shown in connection with the structure of FIG. 6.

The basic demonstration units of FIG. 6 and FIG. 7 are susceptible to various changes to effect the ready demonstration of additional electrical and magnetic phenomena. For example, by using the gear arrangement of FIG. 7 on the unit of FIG. 6, the permanent magnets 50 and 51 may be rotated more rapidly, thereby producing a higher voltage in coils 32 and 33 than that produced when the crank 57 is in direct engagement with the stud 53, as discussed above. With this arrangement, and by comparison, a lamp of higher voltage can be lighted when the gears are rotated at a rate of rotation equivalent to that of the crank 57.

Conversely, the gears 60 and 61 may be reversed so that a very slow rate of rotation is achieved when this modification is used in connection with the structure of FIG. 6. The rate of rotation is such that an electrical meter may be placed in series with the terminals of the coils 32 and 33 without damage to the instrument. With a slow and uniform rotation of the larger gear, the increasing and decreasing current characteristic of alternating current is readily visible by the movement of the indicator of the electrical meter. In addition to the latter, a slow speed gear reduction type motor may be used to directly drive the smaller gear. In this instance, a very accurate indication of the current characteristics of an alternating current is permitted because of the uniform rotational rate.

Moreover, it should be readily understood that further modification of the demonstration unit disclosed in FIG. 6 can be achieved by utilizing but one permanent magnet, for example, which rotates, as discussed above, upon use of crank 57 by the handle 57a thereof. With such an arrangement, a simple electrical generator is achieved which generates two separate out-of-phase currents which can be simply demonstrated by the use of two lamps, one of which is in a circuit with coil 32 and the other of which is in a circuit with coil 33.

As should be apparent from the preceding discussion, and particularly pertinent with respect to FIG. 7, with the use of but one rotatable permanent magnet in co-operation with a demonstration unit utilizing cores 30, 31, 64 and 65, with their respective coils (not shown), each of the cores produces a current which is out-of-phase with respect to the currents from any of the other cores, thereby constituting an electric generator with a four-phase output. Obviously, a three-phase output current can be produced if the unit is modified by using one rotatable permanent magnet in combination with three cores or two rotatable permanent magnets in combination with six cores.

FIG. 9 discloses a teaching unit assembled as a U-type electromagnet, or which may be simply modified to serve as a U-type permanent magnet. The demonstration unit of FIG. 9 comprises cores 70 and 71 which are conventionally secured to another core 72, the latter being formed as the core 10 described in FIG. 2 hereabove. Coils 75 and 76 respectively encircle the cores 70 and 71 and are retained thereon by pins 70a and 71a extending through the latter. A stud 78 having an insulative handle 78a thereon fastens onto the core 72 to provide for convenient use. When assembled as a U-type permanent magnet, 70 and 71 designate permanent magnets and the pins 70a and 71a are not required for the coils 75 and 76 rest on the surface of use. In a typical use with permanent magnets, when the U-type assembly is rapidly withdrawn from the coils 75 and 76, a lamp (not shown), which is connected across and in series with the terminals on the respective coils 75 and 76, flashes very brightly and flashes again when and if the permanent magnets 70 and 71 are returned to the original position thereof shown in FIG. 9, thus, readily demonstrating important principles of induction.

Referring now to FIGS. 10 and 11, a teaching aid is disclosed for demonstrating permanent magnet principles by changing the magnetic reluctance of the core 10 when permanent magnets 80 and 81 are in engagement therewith. In this demonstration unit, the applicant's novel core 10 is not used as a base unit, as was the instance in the various structures discussed above, but rather the electrical components extend downwardly therefrom since the core 10 is in an inverted position. Actually, crossarm 37 is the base unit supported on the feet 16, while support members 35 and 36 act to position the core 10. The magnetic effects shown by locating the permanent magnets 80 and 81 at different preselected positions on the core 10 are readily demonstrated in FIGS. 10 and 11 by the particular configurations of the nails 82 used with the unit for teaching purposes.

Core 10 is again used in the demonstration unit of FIG. 12 for positioning permanent magnets 90 and 91 thereon in combination with electromagnets formed by cores 92 and 93 and the respective coils 94 and 95 therefor. FIG. 13 discloses a typical electrical circuit for achieving the desired phenomena for demonstration purposes. The direct current circuit includes, in series, a direct current power source 96, a knife-switch 97 and, of course, the coils 94 and 95. The demonstration unit illustrates magnetic attraction of the nails 82 in which the electromagnetic lines of force are produced by coils energized by the unidirectional current.

FIGS. 14, 15 and 16 illustrate still further forms of teaching aids useful for producing electromagnetic effects for individual or classroom demonstration. In these instances, the electromagnetic effects are produced by unidirectional currents, but somewhat similar effects could be produced by the application of alternating current of suitable voltage and frequency. The structures of FIGS. 14 and 15 effectively demonstrate the further use of the novel core 10 invented by the applicant herein which serves as a foundation unit for the various teaching aids, and which structures include permanent magnets 100 and 101, core 102 and coil 103 associated therewith, and cores 104 and 105 and their respective coils 106 and 107. Although an electrical circuit is not shown in connection with the specific teaching unit of FIG. 14, in a typical embodiment, a direct current source and a knife-switch would connect across the terminals of the coil 103 thereof. FIG. 16 discloses a typical electrical circuit for use with the structure of FIG. 15, including a direct current power source 110 and a knife-switch 111 in series with the terminals of the coils 106 and 107.

It should be understood with reference to FIGS. 9 to 16, inclusive, that most of the magnets, cores and coils disclosed therein have been assigned different reference numerals for reasons of clarity and that in the actual practice of the invention the same elements may be used as in the preceding figures to thereby permit a wide variety of demonstration units utilizing the same basic components.

From the preceding, it should be apparent that the applicant has provided effective demonstration units for teaching electrical and magnetic phenomena which are versatile for use in combination with various electrical components. It should be further apparent from the above that the applicant's novel invention herein is highly effective for individual or classroom demonstration purposes of any desired scientific principles in the area of electricity and magnetism. Thus, it should be understood from the preceding that the educational devices disclosed herein are susceptible to numerous changes within the spirit of the invention, and that the above description should be considered as illustrative and not as limiting the scope of the following claims:

I claim:

1. An educational device comprising a core of magnetizable material, at least one electromagnet, and means removably positioning said at least one electromagnet directly on said core and within a range of pre-selected positions thereon, a superstructure mounted on said core, and a second electromagnet positioned by said superstructure for electromagnetic cooperation with said at least one electromagnet.

2. An educational device comprising a core of magnetizable material, at least one electromagnet, and means removably positioning said at least one electromagnet directly on said core and within a range of pre-selected positions thereon, a superstructure mounted on said core, said superstructure supporting a mechanism for mounting at least one permanent magnet proximate said at least one electromagnet.

3. An educational device comprising a core of magnetizable material, at least one electromagnet, and means removably positioning said at least one electromagnet within a range of pre-selected positions on said core, a superstructure mounted on said core, said superstructure supporting a mechanism for mounting and rotating at least one permanent magnet proximate said at least one electromagnet.

4. An educational device comprising a core of magnetizable material, at least one electromagnet, and means removably positioning said at least one electromagnet within a range of pre-selected positions on said core, and a superstructure mounted on said core, said superstructure supporting a speed control mechanism from which at least one permanent magnet is mounted and rotated with reference to said at least one electromagnet.

5. An educational device comprising a core of magnetizable material, at least one electromagnet disposed on said core, a superstructure mounted on said core, said superstructure supporting a mechanism for mounting and rotating at least one permanent magnet proximate said at least one electromagnet.

6. An educational device comprising a core of magnetizable material, at least one electromagnet disposed on said core, and a superstructure mounted on said core, said superstructure supporting a speed control mechanism from which at least one permanent magnet is mounted and rotated with reference to said at least one electromagnet.

References Cited in the file of this patent

UNITED STATES PATENTS

| | | |
|---|---|---|
| 886,824 | Langworthy | May 5, 1908 |
| 1,182,636 | Burns | May 9, 1916 |
| 1,817,239 | Crow | Aug. 4, 1931 |
| 2,000,378 | Deisch | May 7, 1935 |
| 2,098,646 | Lewis | Nov. 9, 1937 |
| 2,501,615 | Pugh | Mar. 21, 1950 |
| 2,524,804 | Irby | Oct. 10, 1950 |
| 2,681,438 | Anderson | June 15, 1954 |
| 2,866,276 | Zumwalt | Dec. 30, 1958 |

FOREIGN PATENTS

| | | |
|---|---|---|
| 344,961 | Great Britain | Mar. 19, 1931 |
| 41,172 | Switzerland | Dec. 1, 1907 |

OTHER REFERENCES

Scientific American Supplement No. 182, June 28, 1879, page 2899.